UNITED STATES PATENT OFFICE.

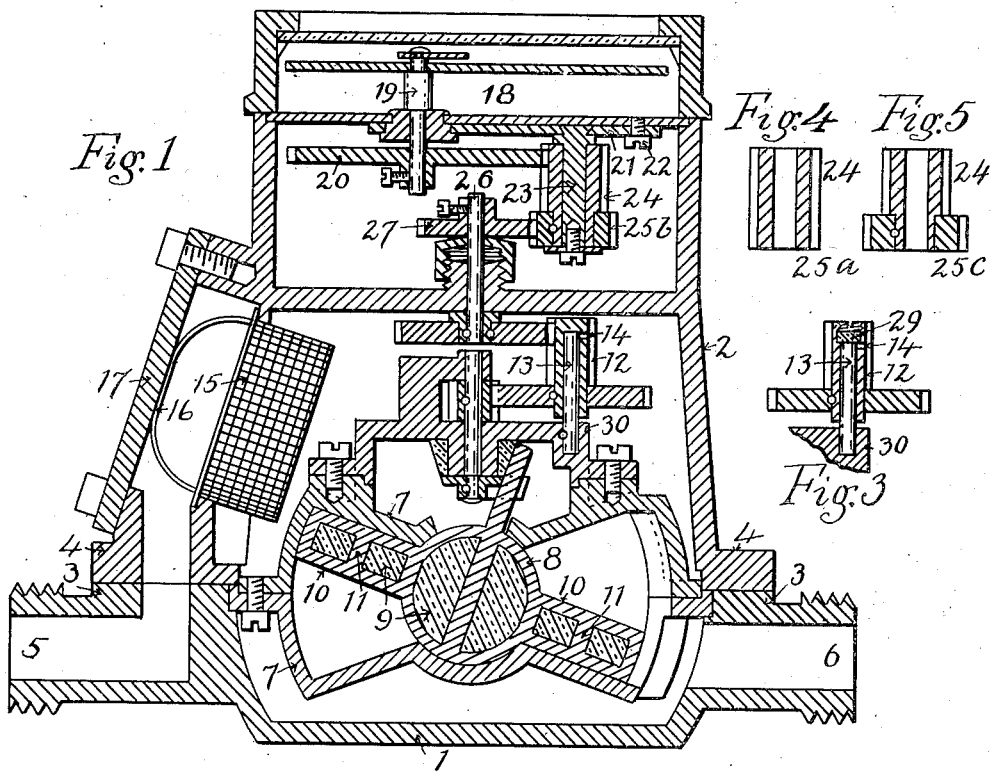

GEORGE B. BASSETT, OF BUFFALO, NEW YORK.

WATER-METER.

1,073,386.  Specification of Letters Patent.  Patented Sept. 16, 1913.

Application filed July 13, 1908. Serial No. 443,279.

*To all whom it may concern:*

Be it known that I, GEORGE B. BASSETT, a citizen of the United States, residing at Buffalo, in the county of Erie and State of New York, have invented a new and useful Water-Meter, of which the following is a specification, reference being had to the drawings accompanying and forming a part thereof.

The objects of my present invention are principally to improve the construction and arrangement of the outside casing, bearings, strainer, indicator gearing, measuring piston or disk, and other parts in the construction of water meters for the purpose of reducing the cost of manufacture, allowing the more ready assemblage, separation, and adjustment of parts, increasing the efficiency and durability, and giving other advantageous results.

I will now proceed to definitely describe the manner in which I have carried out my invention and then claim what I believe to be novel.

In the drawings, Figure 1 is a central vertical longitudinal section of my improved meter showing the interior working parts in place. Fig. 2 is a horizontal upward view of the bottom of the indicator showing the change gears arranged for U. S. gallon indicators. Fig. 3 is a sectional view of a modified form of the intermediate gear and its improved bearing. Fig. 4 is a sectional view of 15 and 15 tooth denominational change gear for cubic foot indicators. Fig. 5 is a sectional view of 15 and 24 tooth denominational change gear for imperial gallon indicators.

The outer casing of the meter is composed of two detachable parts, 1 and 2, which may be fastened together by bolts passing through the meeting flanges 3 and 4. Lower outer casing 1 is provided with an inlet opening 5, and an outlet opening 6. Between the meeting flanges 3 and 4 is supported the measuring chamber 7. Nutating measuring disk 8 is held in measuring chamber 7 and is made with an inner core 9, of light material such as asbestos and magnesia or a mixture of the two, and with an outer surface 10 made of a heavier and stronger material such as cast bronze or aluminum. 11, 11 are stiffening posts formed to support the outer surfaces 10 of the nutating measuring disk 8. This construction makes a light and stiff metal disk piston.

Intermediate gear and pinion 12 is removably mounted on the vertical intermediate gear post 13 which is rigidly fastened in its seat in gear plate 30 on top of measuring chamber 7. The weight of gear and pinion 12 is supported on the top end of intermediate gear post 13 which reduces the friction to a minimum.

14 is a small hole in pinion 12 to permit the water to lubricate this bearing. In some waters where metal bears on metal, the wear is excessive. In such waters, I mount a piece of hard rubber or a jewel or other non-metallic substance, 29, in intermediate gear 12 to receive its weight on top of stud 13 as shown in Fig. 3.

15 is a removable basket strainer with a bail 16 by which it is held to its seat when removable hand hole plate 17 is placed in position. By removing plate 17, strainer 15 may be removed, cleaned, and replaced without opening the outside casing of the meter at meeting flanges 3 and 4.

18 is a water meter indicator of any approved style supported on top of outer casing 2.

19 is the driven shaft of the indicator on which is rigidly mounted indicator percentage change gear 20.

21 is an adjusting arm fastened to the bottom of indicator 18 so that it may be rotated about a center concentric with driven shaft 19 and its percentage change gear 20.

22 is a screw for fastening adjusting arm 21 in any desired position.

23 is a bearing stud rigidly mounted in adjusting arm 21. On bearing stud 23 is loosely mounted idler pinion 24 on which is rigidly mounted denominational idler gear $25^b$.

26 is the stuffing box shaft of the meter on which is rigidly mounted meter change gear 27.

In operation, the water enters inlet opening 5 and passes upward under cap 17, thence through strainer basket 15 into the interior of the meter above the measuring chamber, thence through the measuring chamber 7, operating the measuring disk 8, thence into the interior of the meter below the measuring chamber and thence through outlet 6. The measuring disk 8, as it nutates, operates the intermediate gearing 12 and stuffing box shaft 26 and its meter change gear 27, which meshes with and operates denominational idler gear $25^b$, whose idler pinion 24 meshes with and operates indicator percentage change gear 20 and its driven indicator shaft 19. The usual practice in meter construction is for meter change gear 27 to mesh directly with indicator change gear 20. As the centers of these gears are fixed quite close together, being only about ⅝" of an inch apart, the number of teeth of suitable size that may be used on them is relatively small. This necessitates a great number of different sizes of change gears, some series of meters requiring a stock of several hundred change gears in order to properly adjust each meter when tested to indicate the amount of water that passes through it in the denominations of cubic feet, U. S. gallons, imperial gallons, or other denominations. To properly illustrate the advantages of my improved system of change gears, I will be concrete. By making indicator percentage change gear 20 large and passing it over the top of meter change gear 27, I can, on the same diameter blanks, cut respectively 51, 52, 53, 54, and 55 teeth, without the teeth varying sufficiently in size so much but that they will mesh with idler pinion 24 of denominational idler gear 25ᵇ. Idler pinion 24 I make with 15 teeth because most meters indicate in cubic feet and as the cubic foot denominational idler gear has 15 teeth, I can make the gear and pinion for cubic feet in one piece, as shown in Fig. 4. I test several of the same size meters and find that a meter change gear 27 with say 30 teeth will be suitable to use on the size meter taken.

Meter manufacturers in the United States, have calls mostly for meters indicating in cubic feet, U. S. gallons, and also imperial gallons, for export to Canada. It is usual to test and adjust water meters by weighing the water passed through them while on the testing bench, on the basis that 10 cubic feet of water weighs 625 pounds, 100 U. S. gallons—833⅓ pounds, and 100 imperial gallons—1000 pounds. By using 41¾ as a common divisor, I get the proportions of 15, 20, and 24, as the correct number of teeth for denominational idler gears 25ᵃ, 25ᵇ, and 25ᶜ, in order to correspond with cubic feet, U. S. gallons, and imperial gallons respectively.

In a series of nine sizes of water meters each to be fitted with change gears to indicate in the three denominations of cubic feet, U. S. gallons, and imperial gallons, with five percentage variation for each denomination, it would require with the usual single pair of change gears, $2\times9\times3\times5$, or 270 different sizes of change gears, and 540 different sizes if 10 percentage variations are required. While with my improved system of change gears 9 meter gears, 3 denominational gears, and 5 indicator gears, or only a total of 17 different gears are required instead of 270, and if 10 percentage variations are required, it is only necessary to have two sizes of meter gear 27 for each meter, or $2\times9$ plus 3 plus 5, equals 26 different gears instead of 540. In actual practice, a stock of 1000 meters may be tested and adjusted to register U. S. gallons, each having its proper percentage change gear 20 to bring it to indicate accurately, and each having U. S. gallon denominational change gear 25ᵇ with 20 teeth on stud 23. Should orders be received for meters indicating in cubic feet, it is not necessary to re-test these meters but simply take off U. S. gallon denominational change gear 25ᵇ with 20 teeth from stud 23, and put on cubic foot denominational change gear 25ᵃ with 15 teeth and shift adjusting arm 21 to the lower position shown by dotted lines in Fig. 2. Should orders be received for meters indicating in imperial gallons, put on imperial gallon denominational change gear 25ᶜ with 24 teeth and shift adjusting arm 21 to the upper position shown by dotted lines in Fig. 2. This system of change gears may be applied to other meters than water meters.

Having thus described my invention, what I claim and desire to secure by Letters Patent is—

1. In a water meter, the combination with a bottom casing, a separable top casing and a strainer mounted in said top casing, of a hand hole and a removable hand hole plate in said top casing for giving access to said strainer substantially as and for the purpose described.

2. In a water meter, the combination with a bottom casing, a separable top casing, a strainer mounted in said top casing, and an indicator mounted on said top casing of a hand hole and a removable hand hole plate in said top casing for giving access to said strainer, substantially as and for the purpose described.

3. In a water meter, the combination with a bottom casing containing the inlet and outlet to the meter, a separable top casing mounted on top of said bottom casing and a strainer mounted in said top casing of a hand hole and a hand hole plate in said top casing for giving access to said strainer, substantially as and for the purpose described.

4. In a water meter piston, the combination with a light fire proof inner core such as asbestos of a metal exterior surface, substantially as and for the purpose described.

5. In a water meter piston, the combination with a light fire proof inner core such as asbestos and a metal exterior surface of a metal post extending through said core from one portion of said metal exterior surface to another portion of said surface, substantially as and for the purpose described.

6. A water meter comprising a submerged water operated device; an indicator; a rigid vertical gear post; and a submerged intermediate toothed pinion formed with a longitudinal central hole closed at its upper end and mounted on and inclosing the top end of said gear post on which it rotates in transmitting motion from said device to said indicator, substantially as and for the purpose described.

7. In a water meter, the combination with a water operated device and an indicator for registering the flow, of a rigid metallic gear post, a non-metallic bearing on the top of said gear post and a hollow intermediate toothed pinion or gear mounted on and supported by said bearing and adapted to turn about said post while transmitting motion from said device to said indicator, substantially as and for the purpose described.

8. A water meter comprising a registering indicator, a water operated device, a stuffing box intermediate between said indicator and said water operated device, a stuffing box shaft passing through said stuffing box and actuated at its inner end by the power furnished by said water operated device, a meter change gear fastened on said stuffing box shaft at its outer end, an indicator change gear, and an idler gear actuated by said meter change gear and adjustably mounted relative to one of said change gears, substantially as and for the purpose described.

9. A water meter comprising a registering indicator, a water operated device, a stuffing box intermediate between said indicator and said water operated device, a stuffing box shaft passing through said stuffing box and actuated at its inner end by the power furnished by said water operated device, a meter change gear fastened on said stuffing box shaft at its outer end, an indicator change gear, an idler gear actuated by said meter change gear and means for moving said idler gear around the center of one of said change gears and adjusting the same in relation to the other of said change gears, substantially as and for the purpose described.

10. A water meter comprising a registering indicator, a water operated device, a stuffing box intermediate between said indicator and said water operated device, a stuffing box shaft passing through said stuffing box and actuated at its inner end by the power furnished by said water operated device, a meter change gear fastened on said stuffing box shaft at its outer end, an indicator change gear, and a series of denominational idler change gears, any one of which is adapted to transmit motion from said meter change gear to said indicator change gear, substantially as and for the purpose described.

11. A water meter comprising a registering indicator, a water operated device, a stuffing box intermediate between said indicator and said water operated device, a stuffing box shaft passing through said stuffing box and actuated at its inner end by the power furnished by said water operated device, a meter change gear fastened on said stuffing box shaft at its outer end, an indicator change gear and a series of denominational idler gears whose teeth have the ratios of 15 for indicating cubic feet, 20 for indicating U. S. gallons and 24 for indicating imperial gallons, any one of which is adapted to transmit motion from said meter change gear to said indicator change gear, substantially as and for the purpose described.

12. A water meter comprising a registering indicator, a water operated device, a stuffing box intermediate between said indicator and said water operated device, a stuffing box shaft passing through said stuffing box and actuated at its inner end by the power furnished by said water operated device, a meter change gear fastened on said stuffing box shaft at its outer end, an indicator change gear extending over said meter change gear, and an idler gear adapted to mesh with both said meter change gear and said indicator change gear, substantially as and for the purpose described.

13. A water meter comprising a registering indicator, a water operated device, a stuffing box intermediate between said indicator and said water operated device, a stuffing box shaft passing through said stuffing box and actuated at its inner end by the power furnished by said water operated device, a meter change gear fastened on said stuffing box shaft, an indicator change gear extending over said meter change gear, an idler gear adapted to mesh with both said meter change gear and said indicator change gear and means for adjusting said idler gear relative to one of said change gears, substantially as and for the purpose described.

In witness whereof I have hereunto set my signature this 10th day of July, 1908.

GEORGE B. BASSETT.

Witnesses:
  L. T. BIEHM,
  CHARLES K. BASSETT.